US010248106B2

(12) United States Patent
Tezuka et al.

(10) Patent No.: US 10,248,106 B2
(45) Date of Patent: Apr. 2, 2019

(54) WAVEFORM DISPLAY DEVICE FOR DISPLAYING LENGTH BY CONVERTING FREQUENCY INTO LENGTH ON MACHINED SURFACE

(71) Applicant: FANUC CORPORATION, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 327 days.

(21) Appl. No.: 15/185,022

(22) Filed: Jun. 17, 2016

(65) Prior Publication Data
US 2017/0003674 A1 Jan. 5, 2017

(30) Foreign Application Priority Data
Jun. 30, 2015 (JP) .................................. 2015-132066

(51) Int. Cl.
G05B 19/408 (2006.01)

(52) U.S. Cl.
CPC .............. G05B 19/4086 (2013.01); *G05B 2219/35514* (2013.01); *G05B 2219/37435* (2013.01); *Y02P 90/265* (2015.11)

(58) Field of Classification Search
CPC ...... G05B 19/4086; G05B 2219/35514; G05B 2219/37435; G05B 19/4163; G05B 19/19;
(Continued)

(56) References Cited

U.S. PATENT DOCUMENTS

| 5,913,955 A | * | 6/1999 | Redmond | ............. B23B 29/022 408/143 |
| 2012/0123756 A1 | * | 5/2012 | Wang | ...................... E21B 44/00 703/2 |

FOREIGN PATENT DOCUMENTS

| JP | H6-180247 A | 6/1994 |
| JP | 11-224116 A | 8/1999 |

(Continued)

OTHER PUBLICATIONS

Wang, H., To, S. and Chan, C.Y. "Investigation on the influence of tool-tip vibration on surface roughness and its representative measurement in ultra-precision diamond turning. International Journal of Machine Tools and Manufacture", Jun. 1, 2013, vol. 69, pp. 20-29. (Year: 2013).*

(Continued)

*Primary Examiner* — Jason Lin
*Assistant Examiner* — Alicia M. Choi
(74) *Attorney, Agent, or Firm* — Hauptman Ham, LLP

(57) ABSTRACT

A waveform display device includes a position information acquisition unit for acquiring position information of a drive shaft of a machine tool in a time series manner, a time designation unit for designating a time section that is a display target in a time series of the position information, a tangent direction speed calculation unit for calculating a tangent direction speed of a tool tip end point of the machine tool based on the position information and configuration information of the machine tool, a distance calculation unit for converting the time section into a distance between two points on a machined surface of the machine tool based on the tangent direction speed, and a display unit for displaying the distance between the two points.

1 Claim, 13 Drawing Sheets

(58) Field of Classification Search
CPC ........ Y02P 90/265; G01H 1/003; G01H 1/14; B23Q 17/0976
USPC ........................................................ 700/175
See application file for complete search history.

(56) References Cited

FOREIGN PATENT DOCUMENTS

| | | |
|---|---|---|
| JP | 2007-190628 A | 8/2007 |
| JP | 2013-837 A | 1/2013 |
| JP | 2013-36912 A | 2/2013 |
| JP | 5302371 B2 | 10/2013 |
| JP | 2014-164597 A | 9/2014 |

OTHER PUBLICATIONS

Altintas Y, Weck M. "Chatter stability of metal cutting and grinding", Jan. 1, 2004, CIRP Annals-Manufacturing Technology. vol. 53(2):619-42. (Year: 2004).*

* cited by examiner

WAVEFORM DISPLAY DEVICE FOR DISPLAYING LENGTH BY CONVERTING FREQUENCY INTO LENGTH ON MACHINED SURFACE

RELATED APPLICATIONS

The present application claims priority to Japanese Patent Application Number 2015-132066 filed Jun. 30, 2015, the disclosure of which is hereby incorporated by reference herein in its entirety.

BACKGROUND OF THE INVENTION

1. Field of the Invention

The present invention relates to a waveform display device for displaying a vibration period of a machine tool by converting the same into a length on a machined surface.

2. Description of the Related Art

To improve the quality of a product machined by a machine tool, analyzing waveform data is important for specifying a cause of machining unevenness (such as a stripe pattern) that has been generated on a machined surface of the product.

For example, waveform data that has been measured and data, such as position information of a drive shaft and a tool tip end point are analyzed so that specifying a vibration source that is a cause of machining unevenness is performed. Examples of such a vibration source include vibration of a drive shaft of a machine tool, an oil pump for cooling, and a fan of a strong current board of a machine tool. In general, each vibration source has an inherent vibration frequency (i.e., a reciprocal of a vibration period), and measurement results of a vibration frequency inherent in a vibration source and a vibration frequency of machining unevenness that has been generated on a machined surface of a product are compared with each other to specify the vibration source that is a cause of the vibration frequency.

FIG. 19A is a diagram schematically illustrating an example of machining unevenness that is generated on a machined surface of a product and illustrating a relationship between a direction of machining by a tool of a machine tool and machining unevenness. FIG. 19B is a diagram schematically illustrating an example of machining unevenness that is generated on a machined surface of a product and illustrating an example of measuring a vibration frequency using a scale. As illustrated in FIG. 19A, on the machined surface, machining unevenness (stripe pattern) having a certain period (i.e., a certain frequency) is generated due to some vibration source along a direction of machining by a tool of a machine tool. As illustrated in FIG. 19B, an interval of a stripe pattern is measured using a scale (ruler). For example, when 27 pieces of stripes are generated in a section of 20 mm measured by the scale, an interval of the stripes is 0.741 mm. When a feeding speed of the tool of the machine tool is 2000 mm/min, a vibration frequency is 45 Hz (=2000/60/0.741).

Analysis of waveform data can be made also by comparison of distance bases on a machined surface on which machining unevenness (stripe pattern) exists other than by comparison using the frequency basis as described above.

For example, as disclosed in Japanese Patent Publication No. 5302371, there is an invention in which time series data, such as speed of a drive shaft and a tool tip end point, is converted into distance-based physical data of a horizontal axis movement distance.

The invention as disclosed in Japanese Patent Publication No. 5302371 is useful when the same machining program is performed while machining conditions, such as a machining speed, are changed, and physical data of a horizontal axis time is converted into distance-based physical data of a horizontal axis movement distance, thereby comparing physical data at the same machining position under different machining conditions (such as speed).

Position information of the drive shaft of a machine tool is time-based information that is acquired by a position detector at every moment. Such a time-based waveform cannot be compared directly with machining unevenness (stripe pattern) actually generated on the machined surface, which needs some processing for finding correspondence between the time-based waveform and distance data on the machined surface, and operations are complicated.

In addition, for example, the invention as disclosed in Japanese Patent Publication No. 5302371 fails to calculate a movement distance in a designated time section, and accordingly fails to analyze waveform data by finding correspondence with an interval of a vibration frequency of the machined surface. Further, frequency characteristics fail to be displayed on a distance basis.

SUMMARY OF INVENTION

In view of the above problem, an object of the present invention is to provide a waveform display device capable of displaying a vibration period of waveform data by converting the same into a distance between two points on a machined surface of a machine tool.

To achieve the above object, according to a first embodiment, a waveform display device includes a position information acquisition unit for acquiring position information of a drive shaft of a machine tool in a time series manner, a time designation unit for designating a time section that is a display target in a time series of the position information, a tangent direction speed calculation unit for calculating a tangent direction speed of a tool tip end point of the machine tool based on the position information and configuration information of the machine tool, a distance calculation unit for converting the time section into a distance between two points on a machined surface of the machine tool based on the tangent direction speed, and a display unit for displaying the converted distance between the two points.

The distance calculation unit calculates the distance between the two points by letting the time section designated by the time designation unit be an integration section and integrating the tangent direction speed.

In addition, according to a second embodiment, a waveform display device includes a position information acquisition unit for acquiring position information of a drive shaft of a machine tool in a time series manner, a physical data acquisition unit for acquiring physical data that represents an operation status of the drive shaft in a time series manner, a time designation unit for designating a time section that is a display target in a time series of the physical data or the position information, a tangent direction speed calculation unit for calculating based on the position information and configuration information of the machine tool an average tangent direction speed of a tool tip end point of the machine tool in the time section designated by the time designation unit, a frequency analysis unit for performing a frequency analysis of the physical data or the position data in the time section designated by the time designation unit to output a frequency spectrum, a distance calculation unit for converting a frequency of the frequency spectrum into a distance between two points on a machined surface of the machine tool that corresponds to the frequency using the average tangent direction speed, and a display unit for displaying the converted distance between the two points.

In addition, according to a third embodiment, a waveform display device includes a distance input unit into which a measured distance between two points on a machined surface machined by a machine tool is input, a tangent direction speed input unit into which an average tangent direction speed of a tool tip end point of the machine tool that has performed machining between the two points is input, a frequency calculation unit for calculating a value obtained by dividing an average tangent direction speed by the measured distance between the two points as a frequency that corresponds to the measured distance between the two points, and a display unit for displaying the frequency calculated by the frequency calculation unit.

BRIEF DESCRIPTION OF THE DRAWINGS

The present invention will be more clearly understood by referring to the following accompanying drawings.

DETAILED DESCRIPTION

A waveform display device for displaying a vibration period by converting the same into a length on a machined surface will be described below with reference to the drawings. However, it should be understood that the present invention is not limited to the drawings or embodiments described below.

Figure 1:
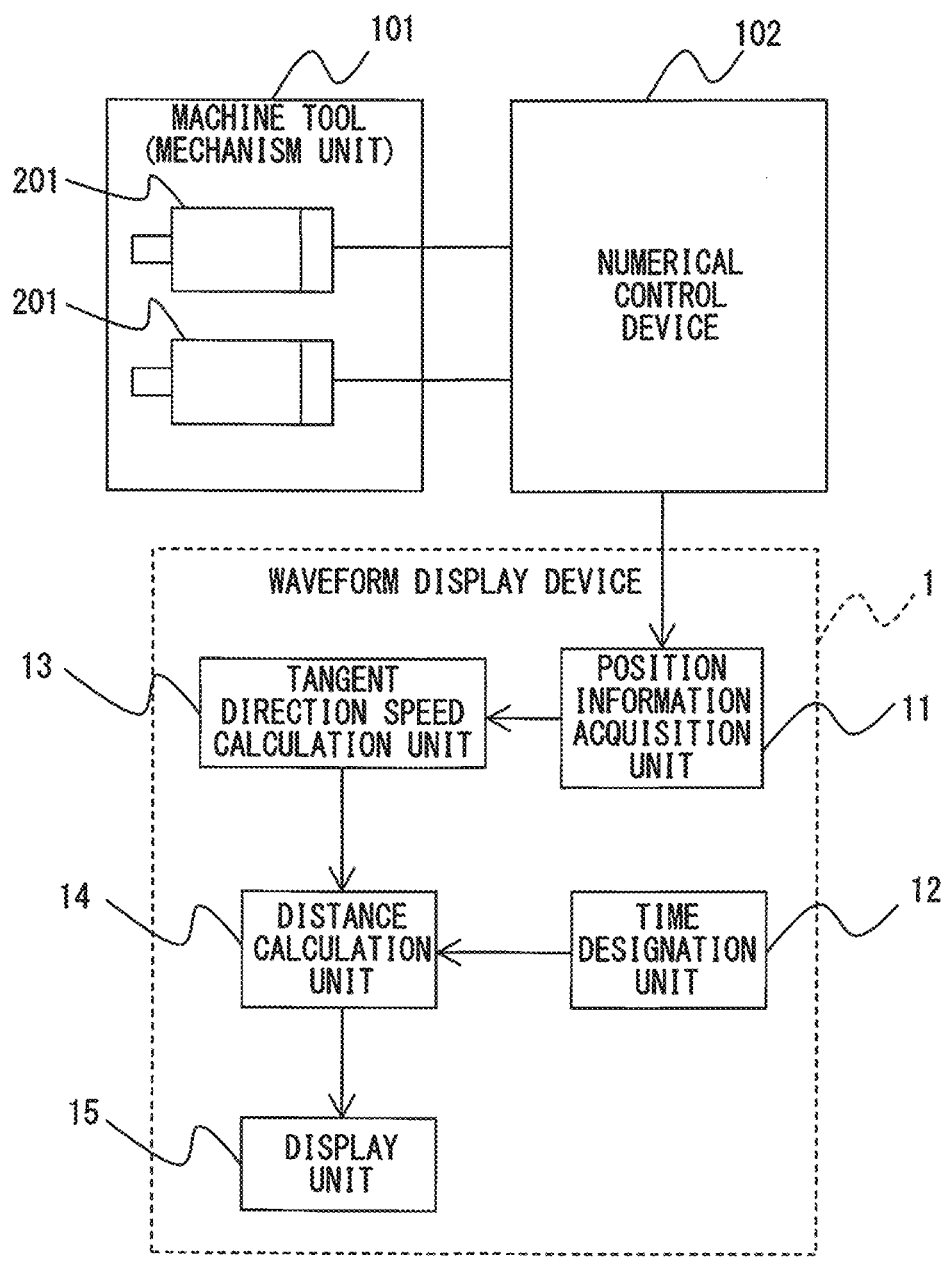
FIG. 1 is a diagram illustrating a system configuration including a waveform display device according to a first embodiment.

FIG. 1 is a diagram illustrating a system configuration including a waveform display device according to a first embodiment. A waveform display device 1 according to the first embodiment is connected to a numerical control device (CNC) 102. A machine tool (mechanism unit) 101 includes at least one (two in the drawing example) drive shaft 201, such as a servo motor, and each drive shaft 201 is controlled by the numerical control device (CNC) 102 based on a predetermined position instruction.

The waveform display device 1 includes a position information acquisition unit 11 for acquiring position information of the drive shaft of the machine tool 101 in a time series manner, a time designation unit 12 for designating a time section that is a display target in a time series of the position information acquired by the position information acquisition unit 11, a tangent direction speed calculation unit 13 for calculating a tangent direction speed of a tool tip end point of the machine tool 101 based on the position information acquired by the position information acquisition unit 11 and configuration information of a tool of the machine tool 101, a distance calculation unit 14 for converting the time section designated by the time designation unit 12 into a distance between two points on a machined surface of the machine tool 101 based on the tangent direction speed calculated by the tangent direction speed calculation unit 13, and a display unit 15 for displaying the converted distance between the two points.

Next, an example of processing in the waveform display device according to the first embodiment will be described with reference to FIGS. 2-8.

Figure 2:
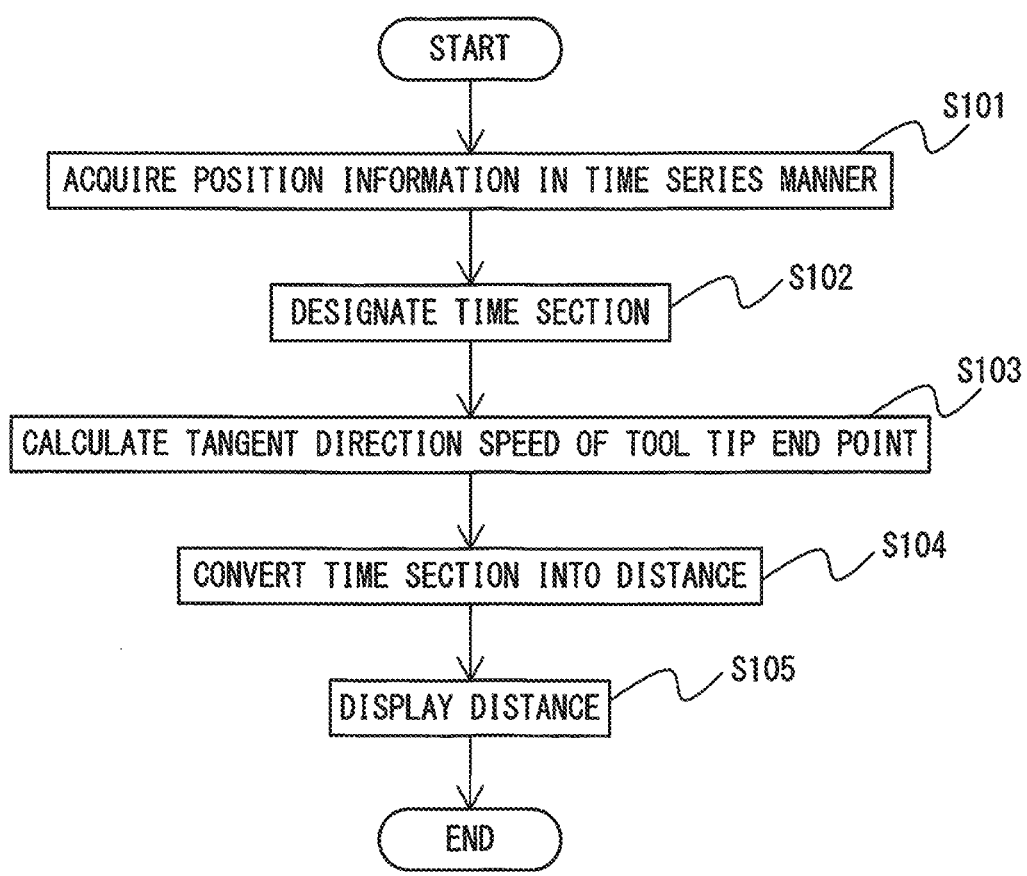
FIG. 2 is a flowchart illustrating an operation flow of the waveform display device according to the first embodiment.

FIG. 2 is a flowchart illustrating an operation flow of the waveform display device according to the first embodiment.

Figure 3:
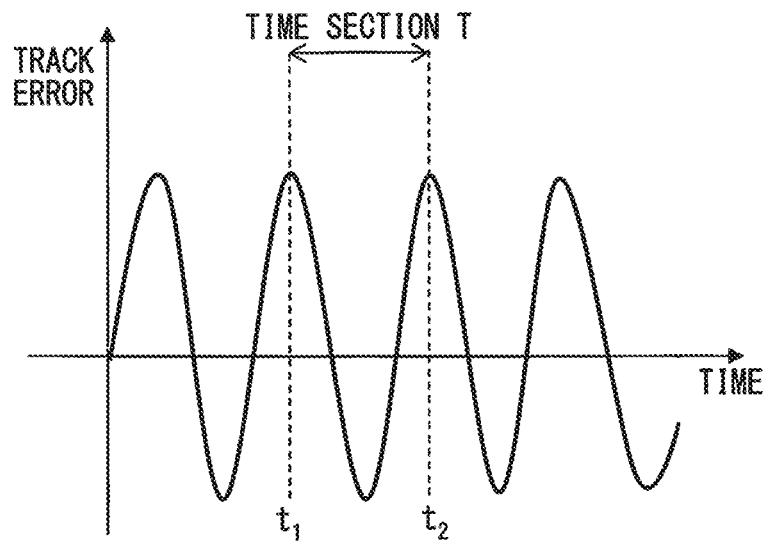
FIG. 3 is a diagram illustrating an example of a track error of a tool tip end point of a machine tool.

First, in step S101, the position information acquisition unit 11 acquires position information of the drive shaft of the machine tool 101 from a position detector (unillustrated) in a time series manner. FIG. 3 is a diagram illustrating an example of a track error of the tool tip end point of the machine tool. The track error of the tool tip end point is periodically generated due to a vibration source.

Next, in step S102, the time designation unit 12 designates a time section that is a display target in a time series of the position information. For example, an operator inputs a desired time section into the time designation unit 12 via a user input device, such as a keyboard, a mouse, or a touch panel input device.

Next, in step S103, the tangent direction speed calculation unit 13 calculates a tangent direction speed of the tool tip end point of the machine tool based on the position information acquired by the position information acquisition unit 11 and configuration information of the machine tool. Examples of the configuration information of the machine tool may include the size, weight, and the like of a member constituting the tool.

Figure 4:
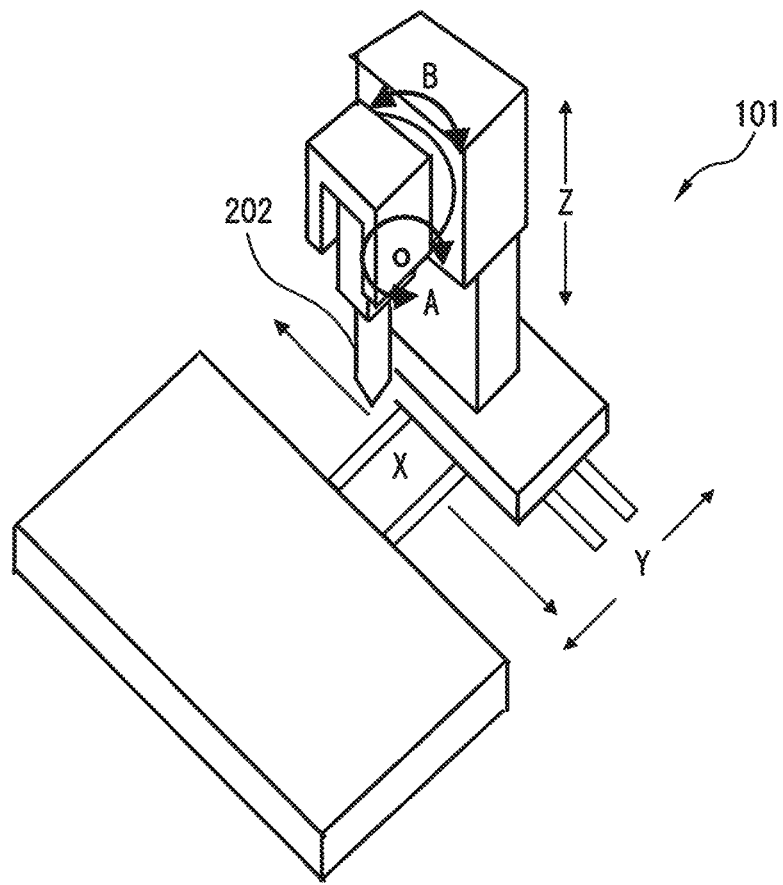
FIG. 4 is a perspective view explaining a tool tip end point in a five-axis machining device.
Figure 5:
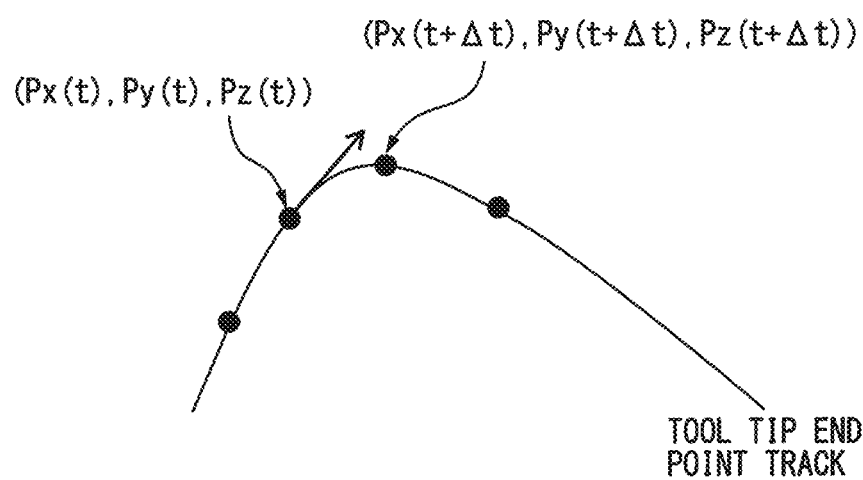
FIG. 5 is a diagram illustrating a track of the tool tip end point in the five-axis machining device as illustrated in FIG. 4.

As an example, calculation of the tangent direction speed of the tool tip end point when the machine tool is a five-axis machining device will be described. FIG. 4 is a perspective view explaining the tool tip end point in the five-axis machining device. As illustrated in FIG. 5, when let linear axes of the five-axis machining device 101 be X-axis, Y-axis, and Z-axis, and let rotation axes be A-axis and B-axis. Let coordinates of the five axes at a time t be x(t), y(t), z(t), a(t), and b(t), and let the intersection of the two rotation axes that is the rotation center thereof be M, with the origin appropriately adopted in consideration of a coordinate system fixed to an object to be machined, a coordinate of the point M is (x(t), y(t), z(t)). When it is assumed that the length from the point M to the tool tip end point is L and a position at which a tool 202 faces straight down as illustrated in FIG. 4 is a reference position (the origin) of the A-axis and the B-axis, a coordinate of the tool tip end point is expressed by Formula 1:

$$Px(t)=x(t)+L\times\cos(a(t))\times\sin(b(t))$$

$$Py(t)=y(t)+L\times\sin(a(t))$$

$$Pz(t)=z(t)-L\times\cos(a(t))\times\cos(b(t)) \quad (1)$$

FIG. 5 is a diagram illustrating a track of the tool tip end point in the five-axis machining device as illustrated in FIG. 4. When a track of the tool tip end point in the five-axis machining device is described as illustrated in FIG. 5, a tangent direction at the coordinate (Px(t), Py(t), Pz(t)) of the tool tip end point is indicated with a dotted arrow in FIG. 5. When it is assumed that a small time is Δt, an x-component Vx(t), a y-component Vy(t), a z-component Vz(t) of a tangent direction speed at the coordinate (Px(t), Py(t), Pz(t)) of the tool tip end point is expressed by the Formula 2:

$$Vx(t) = \frac{Px(t+\Delta t) - Px(t)}{\Delta t} \quad (2)$$

$$Vy(t) = \frac{Py(t+\Delta t) - Py(t)}{\Delta t}$$

$$Vz(t) = \frac{Pz(t+\Delta t) - Pz(t)}{\Delta t}$$

From the Formula 2, the tangent direction speed at the coordinate (Px(t), Py(t), Pz(t)) of the tool tip end point is expressed by the Formula 3:

$$Vt(t)=\sqrt{Vx(t)^2+Vy(t)^2+Vz(t)^2} \quad (3)$$

Returning to FIG. 2, in step S104, the distance calculation unit 14 converts the time section designated by the time designation unit 12 into a distance between two points on a machined surface of the machine tool 101 based on the tangent direction speed calculated by the tangent direction speed calculation unit 13. Further specifically, by letting the time section designated by the time designation unit 12 be an integration section and integrating the tangent direction speed calculated by the tangent direction speed calculation unit 13, the distance calculation unit 14 calculates a distance between two points on the machined surface of the machine tool 101.

Figure 6:
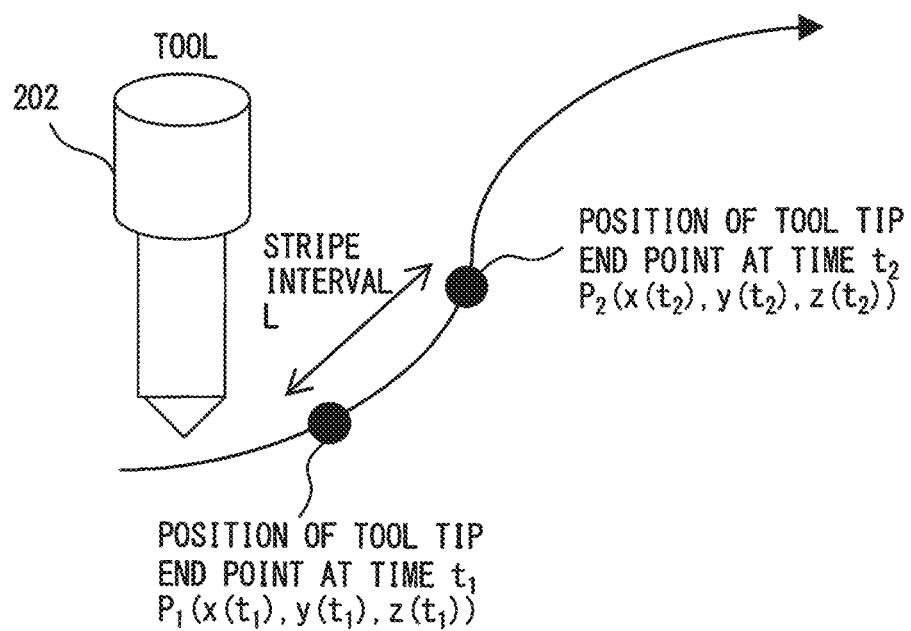
FIG. 6 is a diagram explaining conversion of a distance between two points on a machined surface.

FIG. 6 is a diagram explaining conversion of a distance between two points on the machined surface. A case in which, in step S102, the time designation unit 12 designates the time section that is a display target in a time series of the position information between a time $t_1$ and a time $t_2$ will be examined. As illustrated in FIG. 6, when it is assumed that a coordinate of the tool tip end point on the machined surface at the time $t_1$ is $P_1(x(t_1), y(t_1), z(t_1))$ and a coordinate of the tool tip end point on the machined surface at the time $t_2$ is $P_2(x(t_2), y(t_2), z(t_2))$, a distance between the two points on the machined surface is obtained by letting between the time $t_1$ and the time $t_2$ be the integration section and integrating the tangent direction speed as expressed by the Formula 4.

$$L = \int_{t_1}^{t_2} v_t(t)dt \quad (4)$$

$$= \int_{t_1}^{t_2} \sqrt{v_x(t)^2 + v_y(t)^2 + v_z(t)^2}\, dt$$

$$= \int_{t_1}^{t_2} \sqrt{\left(\frac{dx(t)}{dt}\right)^2 + \left(\frac{dy(t)}{dt}\right)^2 + \left(\frac{dz(t)}{dt}\right)^2}\, dt$$

Returning to FIG. 2, in step S105, the display unit 15 displays the distance between the two points that has been calculated by the distance calculation unit 14. Examples of the display unit 15 may include a display of a personal computer or a touch panel and a display attached to the machine tool. Alternatively, an embodiment in which display is made by printing out the distance between two points that has been calculated by the distance calculation unit 14 on paper using a printer may be employed. Alternatively, data of the distance between two points that has been calculated by the distance calculation unit 14 may be stored in a recording media, such as a hard disk, CD-R, or DVD-R, and display may be made by the display unit 15 at a time desired by an operator.

Figure 7:
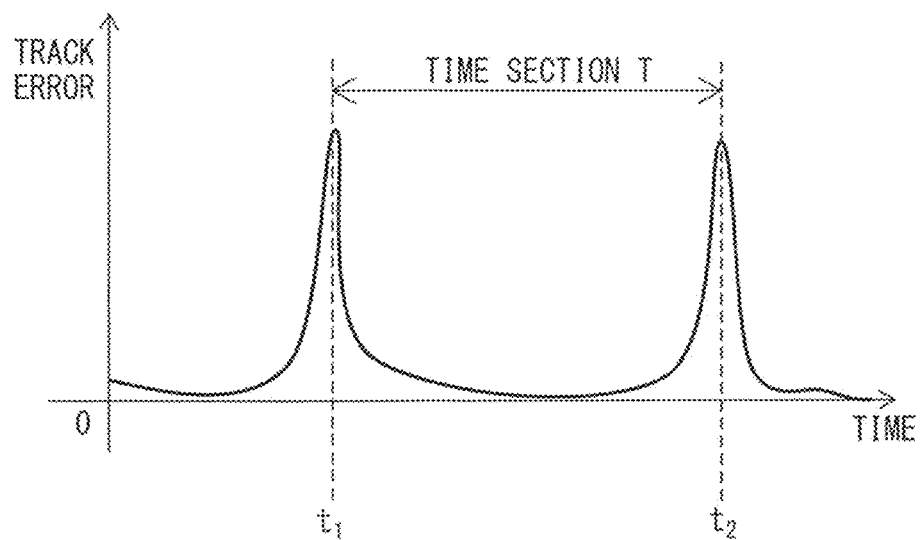
FIG. 7 is a diagram illustrating an example of a track error of the tool tip end point of the machine tool.
Figure 8:
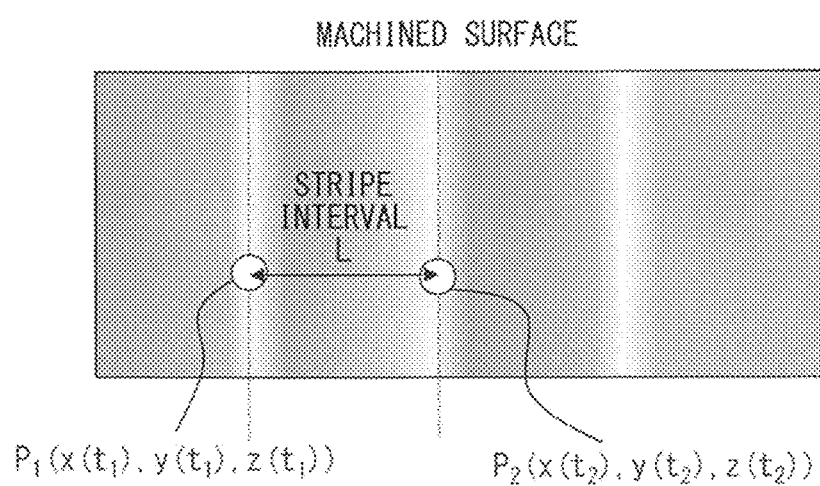
FIG. 8 is a diagram illustrating a relationship between a distance between two points on a machined surface that is obtained by converting a time section as illustrated in FIG. 7 and machining unevenness on the machined surface.

As described above, according to the first embodiment, a time section designated in time series data of the position information acquired by the position information acquisition unit 11 can be converted into a distance between two points on the machined surface of the machine tool 101. The obtained distance between two points on the machined surface is displayed by the display unit 15, while may be displayed in such a manner as to overlap with image data of the machined surface of an actual product so as to be useful for various analyses. This will be described with reference to FIGS. 7 and 8. FIG. 7 is a diagram illustrating an example of a track error of the tool tip end point of the machine tool, and FIG. 8 is a diagram illustrating a relationship between a distance between two points on a machined surface that is obtained by converting a time section as illustrated in FIG. 7 and machining unevenness on the machined surface. In general, machining unevenness (stripe pattern) is likely to be generated at a part at which a track error of the tool tip end point is large, and the track error periodically varies due to a vibration source. As illustrated in FIG. 7, when a peak value of the track error appears at a time $t_1$ and a time $t_2$, a time section T from the time $t_1$ to the time $t_2$ is designated by the time designation unit 12 and the time period is converted by the distance calculation unit 14 into a distance L between two points on the machined surface of the machine tool 101. When let a coordinate of the tool tip end point on the machined surface at the time $t_1$ be $P_1(x(t_1), y(t_1), z(t_1))$ and let a coordinate of the tool tip end point on the machined surface at the time $t_2$ be $P_2(x(t_2), y(t_2), z(t_2))$, the distance L between the two points on the machined surface that is calculated by the distance calculation unit 14 is expressed by the Formula 4. The distance L between the two points on the machined surface that is calculated by the distance calculation unit 14 and an interval L' of a stripe pattern on the machined surface that is separately measured using a scale (ruler) with respect to an actual product are compared with each other, and when these correspond to each other, the track error of the tool tip end point as illustrated in FIG. 7 can be specified as a cause of machining unevenness on the machined surface of the actual product. Thus, operations, such as appropriately changing machining conditions so as to reduce the track error of the tool tip end point in order to improve the quality of the product, can be performed.

Subsequently, a second embodiment will be described.

Figure 9:
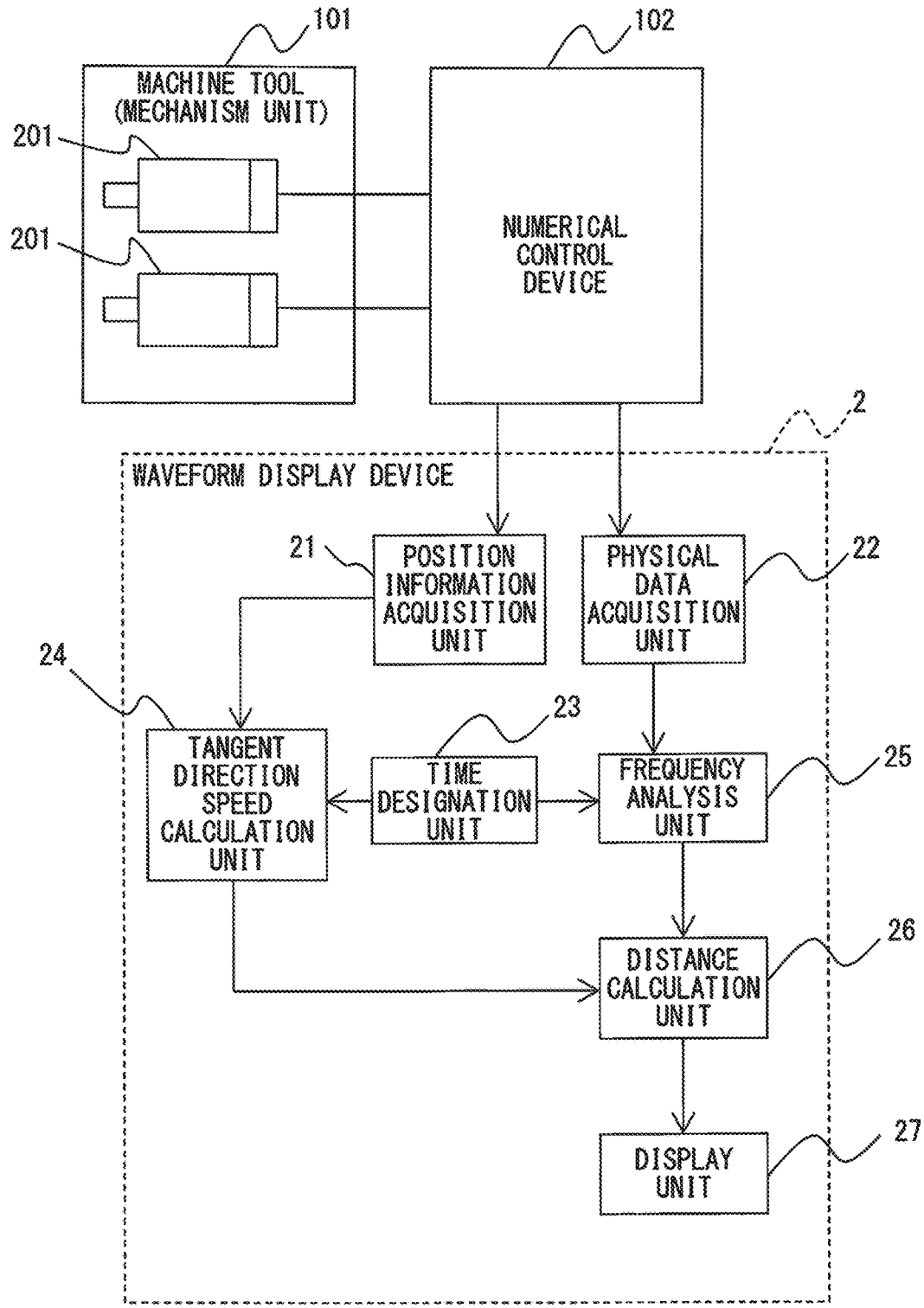
FIG. 9 is a diagram illustrating a system configuration including a waveform display device according to a second embodiment.

FIG. 9 is a diagram illustrating a system configuration including a waveform display device according to the second embodiment. A waveform display device 2 according to the second embodiment is connected to the numerical control device (CNC) 102. The machine tool (mechanism unit) 101 includes at least one (two in the drawing example) drive shaft 201, such as a servo motor, and each drive shaft 201 is controlled by the numerical control device (CNC) 102 based on a predetermined position instruction.

The waveform display device 2 includes a position information acquisition unit 21 for acquiring position information of the drive shaft 201 of the machine tool 101 in a time series manner, a physical data acquisition unit 22 for acquiring physical data that represents an operation status of the drive shaft 201 in a time series manner, a time designation unit 23 for designating a time section that is a display target in a time series of the physical data or the position information, a tangent direction speed calculation unit 24 for calculating an average tangent direction speed of a tool tip end point of the machine tool 101 in the time section designated by the time designation unit 23 based on the position information acquired by the position information acquisition unit 21 and configuration information of the machine tool 101, a frequency analysis unit 25 for performing a frequency analysis of the physical data or the position data in the time section designated by the time designation unit 23 to output a frequency spectrum, a distance calculation unit 26 for converting a frequency of the frequency spectrum into a distance between two points on the machined surface of the machine tool 101 that corresponds to the frequency using the average tangent direction speed calculated by the tangent direction speed calculation unit 24, and a display unit 27 for displaying the converted distance between the two points.

Next, an example of processing in the waveform display device according to the second embodiment will be described with reference to FIGS. 10-14.

Figure 10:
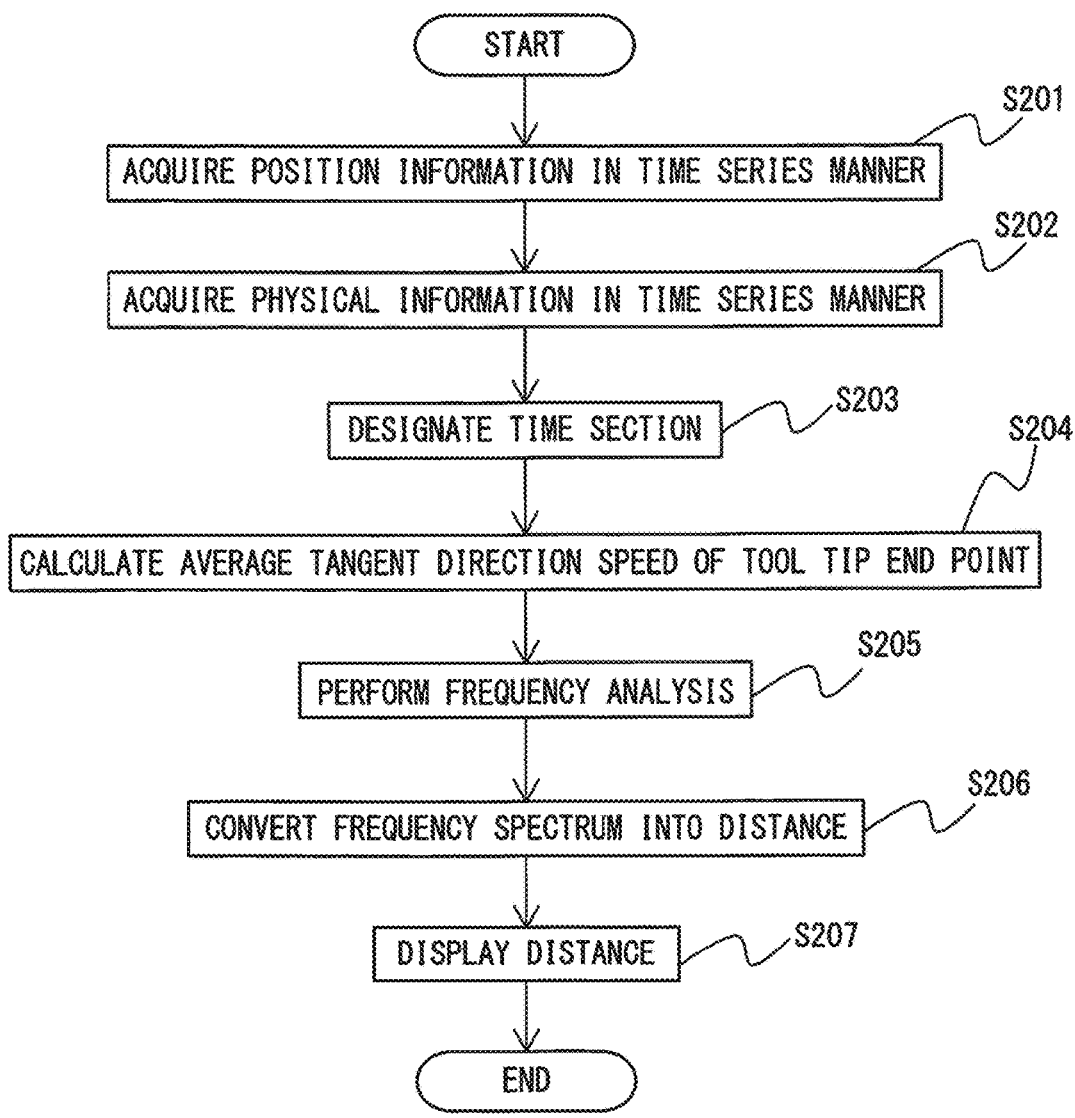
FIG. 10 is a flowchart illustrating an operation flow of the waveform display device according to the second embodiment.

FIG. 10 is a flowchart illustrating an operation flow of the waveform display device according to the second embodiment.

Figure 11:
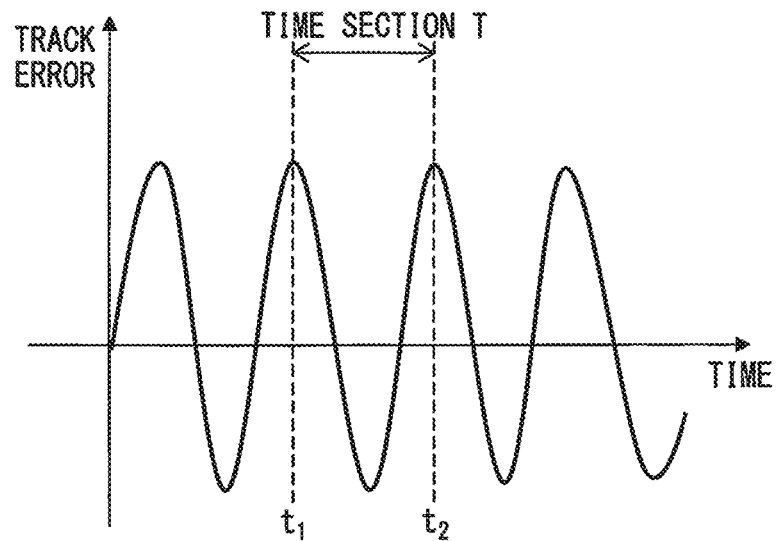
FIG. 11 is a diagram illustrating an example of a track error of the tool tip end point of the machine tool.

First, in step S201, the position information acquisition unit 21 acquires position information of the drive shaft of the machine tool 101 from a position detector (unillustrated) in a time series manner. FIG. 11 is a diagram illustrating an example of a track error of the tool tip end point of the machine tool. The track error of the tool tip end point is periodically generated due to some vibration source.

Next, in step S202, the physical data acquisition unit 22 acquires physical data that represents an operation status of the drive shaft 201 in a time series manner. Examples of the physical data that represents an operation status of the drive shaft 201 may include a torque instruction to a motor that drives the drive shaft 201, a value of an active current that flows in the motor, and a value of a voltage applied to the motor.

Next, in step S203, the time designation unit 23 designates a time section that is a display target in a time series of the physical data. Alternatively, the time designation unit 23 designates a time section that is a display target in a time series of the position information. For example, an operator inputs a desired time section into the time designation unit 23 via a user input device, such as a keyboard, a mouse, or a touch panel input device.

Figure 12:
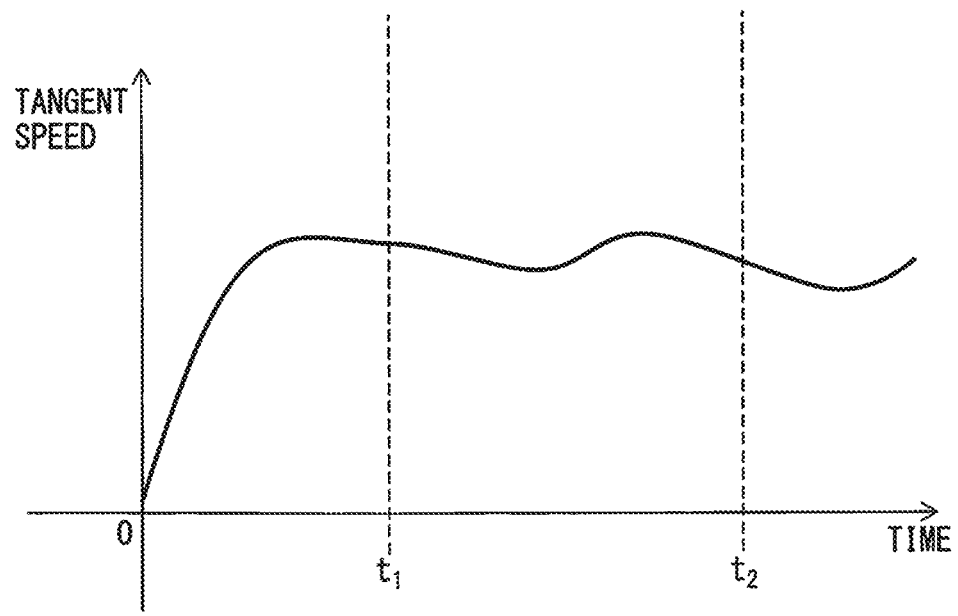
FIG. 12 is a diagram illustrating a tangent direction speed of the tool tip end point of the machine tool.

Next, in step S204, the tangent direction speed calculation unit 24 calculates an average tangent direction speed of a tool tip end point of the machine tool 101 in the time section designated by the time designation unit 23. FIG. 12 is a diagram illustrating a tangent direction speed of the tool tip end point of the machine tool.

For example, when let an instantaneous value of the tangent direction speed of the tool tip end point of the machine tool 101 be V(t) and a time section T from a time $t_1$ to a time $t_2$ is designated by the time designation unit 23, an average tangent direction speed $Vt_a$ of the tool tip end point of the machine tool 101 at the time section T may be determined based on the Formula 5.

$$Vta = \frac{\int_{t1}^{t2} Vt(t) dt}{(t2 - t1)} \qquad (5)$$

Further, for example, when the time section T from the time $t_1$ to the time $t_2$ is designated by the time designation unit 23, the average tangent direction speed $Vt_a$ of the tool tip end point of the machine tool 101 in the time section T, wherein the time section T is divided into "n–m" pieces (wherein m and n are natural numbers, m<n), and let the tangent direction speed of the tool tip end point of the machine tool 101 in each of sections be V(t), may be determined based on the Formula 6 in a discrete manner.

$$Vta = \frac{\sum_{k=n}^{n} Vt(k \cdot \Delta t)}{(n - m)} \qquad (6)$$

Further, for example, when the time section T from the time $t_1$ to the time $t_2$ is designated by the time designation unit 23, the average tangent direction speed $Vt_a$ of the tool tip end point of the machine tool 101 in the time section T, wherein the time section T is divided into "n–m" pieces (wherein m and n are natural numbers, m<n), and let the tangent direction speed of the tool tip end point of the machine tool 101 in each of sections be V(t), may be determined in the form of the root mean square represented by Formula 7.

$$V_{trms} = \sqrt{\frac{1}{(n-m)} \sum_{k=n}^{n} Vt(k \cdot \Delta t)^2} \quad (7)$$

Figure 13:
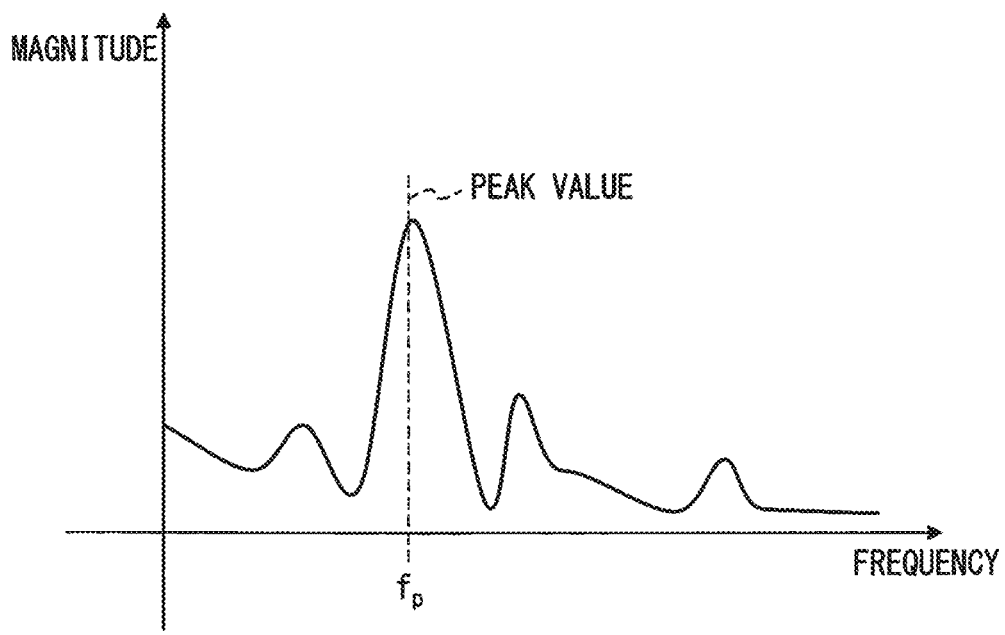
FIG. 13 is a diagram illustrating an example of a frequency spectrum obtained by subjecting physical data to a frequency analysis.

Returning to FIG. 10, in step S205, the frequency analysis unit 25 performs a frequency analysis of the physical data in the time section designated by the time designation unit 23 in step S203 to output a frequency spectrum. Note that, when the time designation unit 23 designates a time section that is a display target in a time series of the position information in step S203, the position information in the designated time section is subjected to the frequency analysis to output a frequency spectrum. Examples of the frequency analysis may include Fourier transformation. FIG. 13 is a diagram illustrating an example of the frequency spectrum obtained by subjecting the physical data to the frequency analysis. In the example as illustrated, a peak value appears at a frequency $f_p$.

Figure 14:
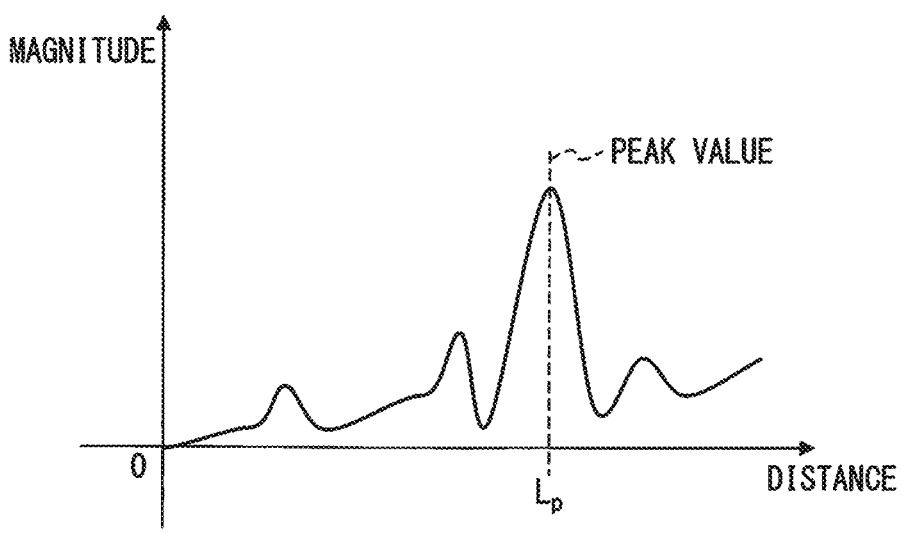
FIG. 14 is a diagram illustrating a case in which a frequency of the frequency spectrum calculated by a frequency analysis unit is converted into a distance between two points on a machined surface.

In step S206, the distance calculation unit 26 converts a frequency of the frequency spectrum calculated by the frequency analysis unit 25 into a distance between two points on a machined surface of the machine tool 101 that corresponds to the frequency using the average tangent direction speed calculated by the tangent direction speed calculation unit 24. The frequency $f_p$ when the frequency spectrum calculated by the frequency analysis unit 25 is at a peak value is converted in accordance with the Formula 8 using the average tangent direction speed $V_{ta}$ calculated by the tangent direction speed calculation unit 24 and is converted into a distance $L_p$ between two points on the machined surface. FIG. 14 is a diagram illustrating a case in which a frequency of the frequency spectrum calculated by the frequency analysis unit is converted into a distance between two points on the machined surface.

$$L_p = 1/f \times v_{ta} \quad (8)$$
$$= T \times v_{ta}$$

Returning to FIG. 10, in step S207, the display unit 27 displays the distance between the two points that has been calculated by the distance calculation unit 26. Examples of the display unit 27 may include a display of a personal computer or a touch panel and a display attached to the machine tool. Alternatively, an embodiment in which display is made by printing out the distance between two points that has been calculated by the distance calculation unit 14 on paper using a printer may be employed. Alternatively, data of the distance between two points that has been calculated by the distance calculation unit 26 may be stored in a recording media, such as a hard disk, CD-R, or DVD-R, and display may be made by the display unit 27 at a time desired by an operator.

As described above, according to the second embodiment, a time section in time series data of the physical data acquired by the physical data acquisition unit 22 or a time section in time series data of the position information acquired by the position information acquisition unit 21 can be converted into a distance between two points on the machined surface of the machine tool 101. The obtained distance between two points on the machined surface is displayed by the display unit 27, while may be displayed in such a manner as to overlap with image data of the machined surface of an actual product so as to be useful for various analyses. This will be described with reference to FIGS. 13 and 14. A case in which, as a result of performing a frequency analysis of the physical data acquired by the physical data acquisition unit 22 by the frequency analysis unit 25, a frequency spectrum as illustrated in FIG. 13 is obtained will be examined. In order to compare the interval L' of a stripe pattern on the machined surface that is separately measured using a scale (ruler) with respect to an actual product, a frequency of the frequency spectrum as illustrated in FIG. 13 is converted into the distance L between two points on the machined surface of the machine tool 101 by the distance calculation unit 26. If the distance L between the two points on the machined surface that is calculated by the distance calculation unit 26 and the interval L' of the stripe pattern on the machined surface that is separately measured using a scale (ruler) with respect to the actual product are compared with each other, specifying a vibration source that is a cause of machining unevenness (stripe pattern) can be easily performed.

Subsequently, a third embodiment will be described.

Figure 15:
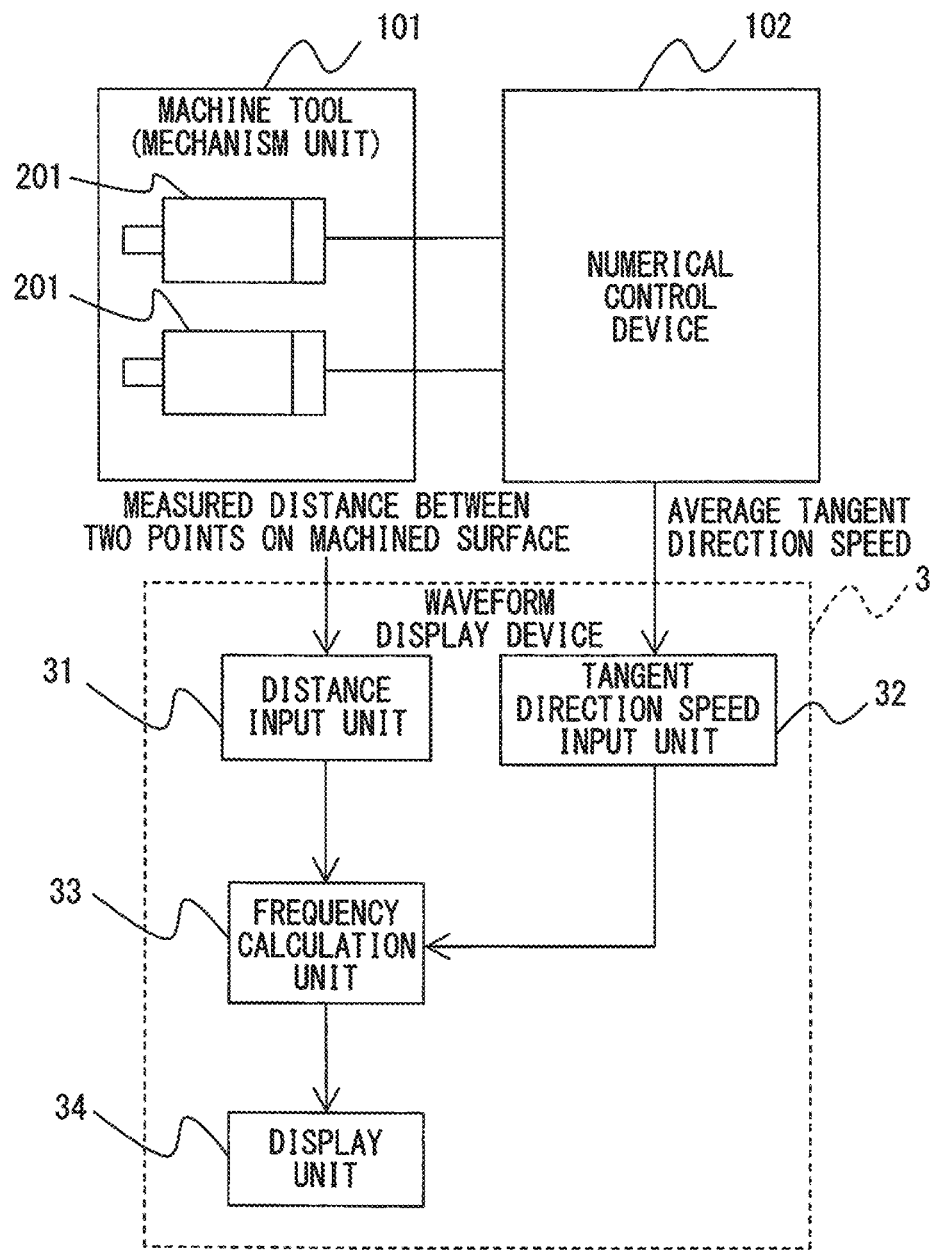
FIG. 15 is a diagram illustrating a system configuration including a waveform display device according to a third embodiment.

FIG. 15 is a diagram illustrating a system configuration including a waveform display device according to the third embodiment. A waveform display device 3 according to the third embodiment is connected to the numerical control device (CNC) 102. The machine tool (mechanism unit) 101 includes at least one (two in the drawing example) drive shaft 201, such as a servo motor, and each drive shaft 201 is controlled by the numerical control device (CNC) 102 based on a predetermined position instruction.

The waveform display device 3 includes a distance input unit 31 into which a measured distance between two points on a machined surface machined by the machine tool 101 is input, a tangent direction speed input unit 32 into which an average tangent direction speed of a tool tip end point of the machine tool 101 that has performed machining between the two points is input, a frequency calculation unit 33 for calculating a value obtained by dividing an average tangent direction speed by the measured distance between the two points as a frequency that corresponds to the measured distance between the two points, and a display unit 34 for displaying the frequency calculated by the frequency calculation unit 33.

Figure 17:
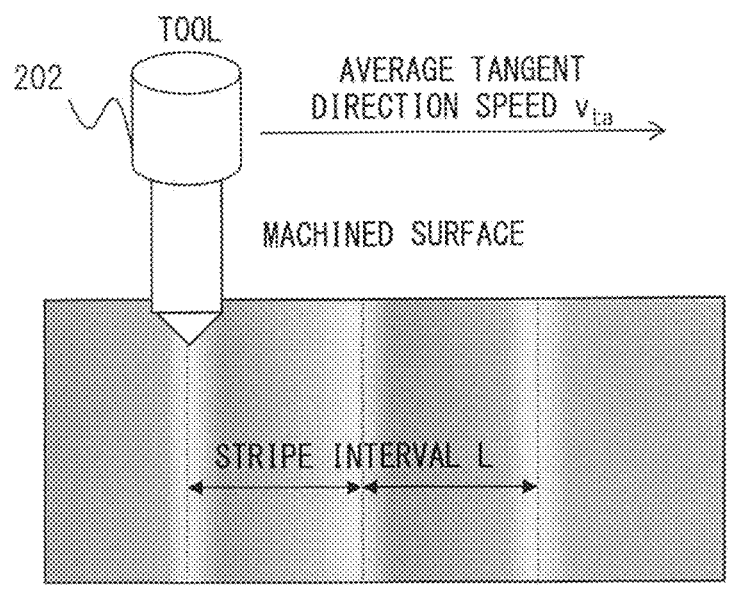
FIG. 17 is a diagram explaining measurement of an interval of machining unevenness (stripe pattern) on a machined surface machined by the machining tool and an average tangent direction speed of the tool tip end point.
Figure 18:
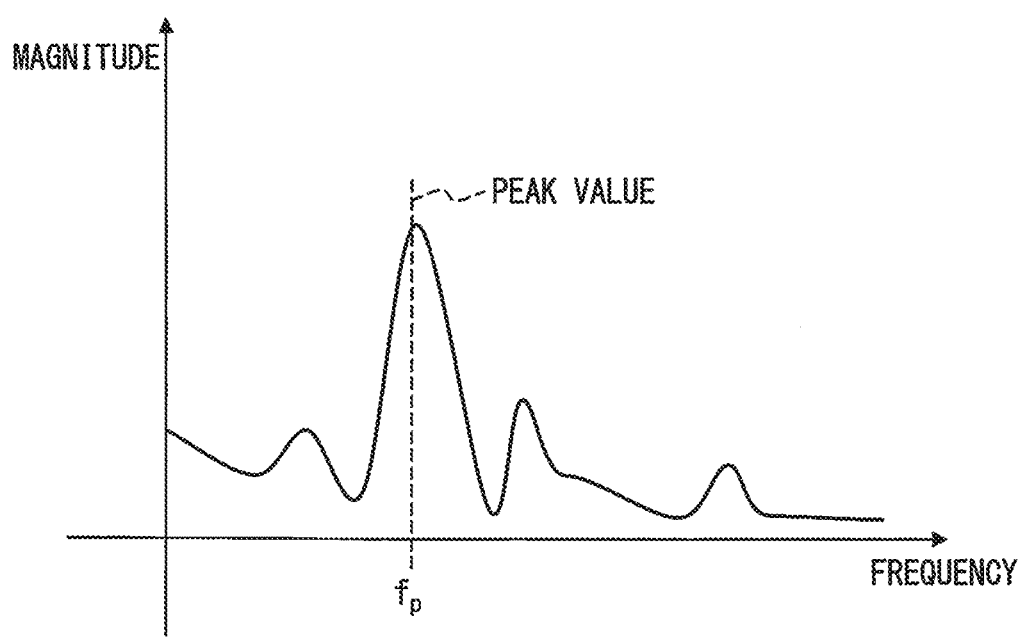
FIG. 18 is a diagram illustrating an example of a frequency spectrum obtained by subjecting physical data to a frequency analysis.
Figure 19A:
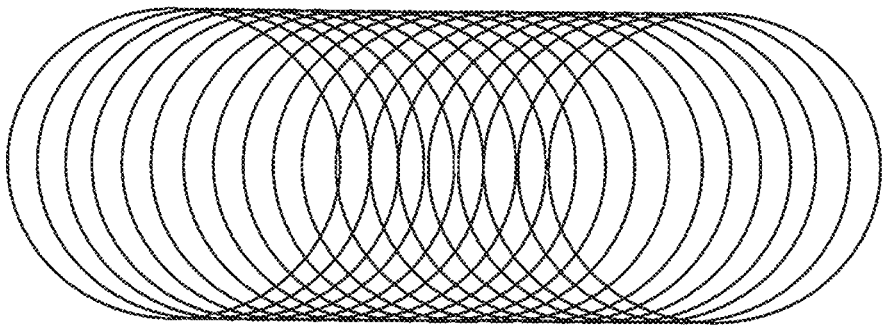
FIG. 19A is a diagram schematically illustrating an example of machining unevenness that is generated on a machined surface of a product and illustrating a relationship between a direction of machining by a tool of a machine tool and machining unevenness.
Figure 19B:
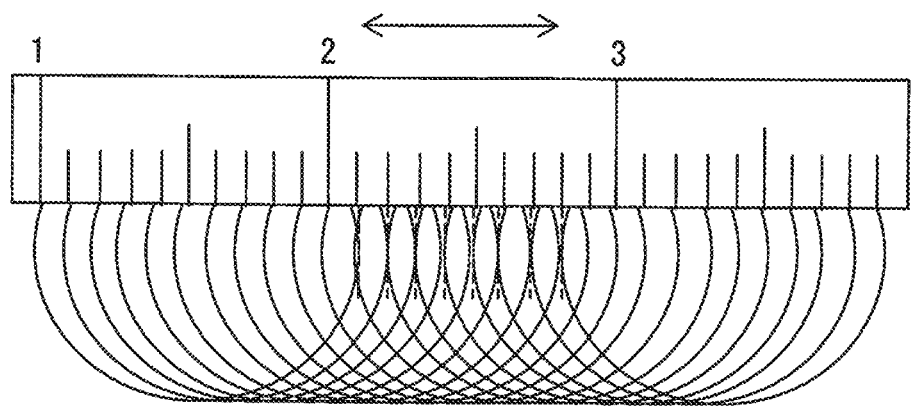
FIG. 19B is a diagram schematically illustrating an example of machining unevenness that is generated on a machined surface of a product and illustrating an example of measuring a vibration frequency using a scale.

Next, an example of processing in the waveform display device according to the third embodiment will be described with reference to FIGS. 16-18.

Figure 16:
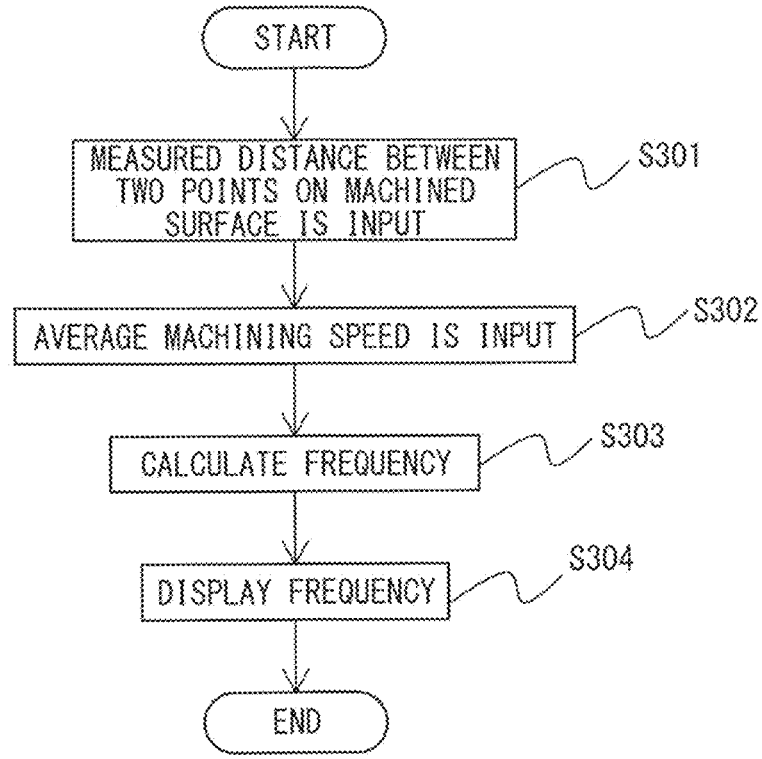
FIG. 16 is a flowchart illustrating an operation flow of the waveform display device according to a third embodiment.

FIG. 16 is a flowchart illustrating an operation flow of the waveform display device according to the third embodiment.

First, in step S301, a measured distance between two points on a machined surface machined by the machine tool 101 is input into the distance input unit 31. FIG. 17 is a diagram explaining measurement of an interval of machining unevenness (stripe pattern) on the machined surface machined by the machining tool and the average tangent direction speed of the tool tip end point. As illustrated in FIG. 17, an interval L of machining unevenness (stripe pattern) on the machined surface machined by the machine tool 101 is measured using a scale (ruler), and the measured distance between two points is input into the distance input unit 31. For example, an operator inputs the measured distance between the two points into the distance input unit 31 via a user input device, such as a keyboard, a mouse, or a touch panel input device.

Next, in step S302, an average tangent direction speed $V_{ta}$ of a tool tip end point of the machine tool 101 that has performed machining between the two points is input into the tangent direction speed input unit 32. For example, the average tangent direction speed $V_{ta}$ calculated based on data used when the numerical control device 102 controls the machining by the machine tool 101 may be used. Alternatively, a movement distance and a movement time of the tool tip end point of the machine tool 101 are actually measured and the measured movement distance is divided by the movement time, thereby determining the average tangent direction speed $V_{ta}$, which may be input into the tangent direction speed input unit 32 by an operator himself.

Next, in step S303, the frequency calculation unit 33 calculates a value obtained by dividing an average tangent direction speed $V_{ta}$ by the measured distance L between the two points as a frequency f that corresponds to the measured distance between the two points. Further specifically, since a value T ($=L/V_{ta}$) in which the measured distance L between the two points is divided by the average tangent direction speed $V_{ta}$ represents a period, a reciprocal of the period, 1/T, is the frequency f as expressed by the Formula 9.

$$f=1/(L/v_{ta}) \qquad (9)$$

Next, in step S304, the display unit 34 displays the frequency calculated by the frequency calculation unit 33. Examples of the display unit 34 may include a display of a personal computer or a touch panel and a display attached to the machine tool. Alternatively, an embodiment in which display is made by performing printout on a paper or the like using a printer may be employed. Alternatively, data of the frequency calculated by the frequency calculation unit 33 may be stored in a recording media, such as a hard disk, CD-R, or DVD-R, and display may be made by the display unit 34 at an appropriate time.

As described above, according to the third embodiment, the measured distance L (i.e., an interval of machining unevenness (stripe pattern) on the machined surface machined by the machining tool 101) between two points on the machined surface machined by the machine tool 101 that is input into the distance input unit 31 can be converted into a frequency. The obtained frequency is displayed by the display unit 34, while if physical data in a predetermined time section, such as a torque instruction to the motor that drives the drive shaft 201, a value of an active current that flows in the motor, and a value of a voltage applied to the motor, is subjected to a frequency analysis (for example, Fourier transformation), and thus obtained frequency spectrum is compared with the frequency displayed by the display unit 34, which will be useful for various analyses. FIG. 18 is a diagram illustrating an example of a frequency spectrum obtained by subjecting physical data to a frequency analysis. In the example as illustrated, a peak value appears at the frequency $f_p$. A case in which physical data is subjected to a frequency analysis so that a frequency spectrum as illustrated in FIG. 18 is obtained will be examined. In order to compare the frequency spectrum with respect to the physical data obtained by the frequency analysis, the measured distance L (i.e., an interval of machining unevenness (stripe pattern) on the machined surface machined by the machining tool 101) between the two points on the machined surface machined by the machine tool 101 that is input into the distance input unit 31 is converted into a frequency. If the peak value $f_p$ of the frequency spectrum with respect to the physical data obtained by the frequency analysis and the frequency into which the measured distance L between the two points on the machined surface are compared with each other, specifying a vibration source that is a cause of machining unevenness (stripe pattern) can be easily performed.

The position information acquisition unit 11, the time designation unit 12, the tangent direction speed calculation unit 13, and the distance calculation unit 14 in the first embodiment, the position information acquisition unit 21, the physical data acquisition unit 22, the time designation unit 23, the tangent direction speed calculation unit 24, the frequency analysis unit 25, and the distance calculation unit 26 in the second embodiment, and the distance input unit 31, the tangent direction speed input unit 32, and the frequency calculation unit 33 in the third embodiment as described above may be built, for example, in the form of a software program, or may be built by combination of various digital electronic circuits and a software program. For example, when these sections are built in the form of a software program, each of the sections as described above operates in accordance with the software program, whereby functions of each of the sections as described above are achieved.

According to the present invention, the waveform display device capable of displaying a vibration period of the machining device by converting the same into a distance between two points on the machined surface of the machine tool can be achieved.

For example, the invention as disclosed in Japanese Patent Publication No. 5302371 fails to calculate a movement distance in a designated time section, and accordingly fails to analyze waveform data by finding correspondence with an interval of a vibration frequency of the machined surface, and further, frequency characteristics fail to be displayed on a distance basis. In contrast, according to the present invention, waveform data can be analyzed by finding correspondence with an interval of a vibration frequency of the machined surface, and frequency characteristics can be displayed on a distance basis.

According to the first embodiment, a time section designated in time series data of the position information acquired by the position information acquisition unit can be converted into a distance between two points on the machined surface of the machine tool 101. The converted distance between two points on the machined surface is displayed by the display unit, while may be displayed in such a manner as to overlap with image data of the machined surface of an actual product so as to be useful for various analyses. In general, machining unevenness (stripe pattern) is likely to be generated at a part at which a track error of the tool tip end point is large, and there are cases in which the track error periodically varies. The converted distance between the two points on the machined surface and an interval of a stripe pattern on the machined surface that is separately measured using a scale (ruler) with respect to an actual product are compared with each other, whereby specifying a vibration source that is a cause of machining unevenness can be easily performed. For example, operations, such as appropriately changing machining conditions so as to reduce the track error of the tool tip end point in order to improve the quality of the product, can be easily performed.

According to the second embodiment, physical data, such as a torque instruction to the motor that drives the drive shaft of the machine tool, a value of an active current that flows in the motor, and a value of a voltage applied to the motor or time series data of position information is subjected to a frequency analysis to determine a frequency spectrum, and a frequency of the obtained frequency spectrum can be converted into a distance between two points on the machined surface of the machine tool that corresponds to the frequency. The converted distance between the two points on the machined surface is displayed by the display unit, while may be displayed in such a manner as to overlap with image data of the machined surface of an actual product so as to be useful for various analyses. For example, if the converted distance between the two points on the machined surface and the interval of a stripe pattern on the machined surface that is separately measured using a scale (ruler) with respect to the actual product are compared with each other, specifying a vibration source that is a cause of machining unevenness (stripe pattern) can be easily performed.

According to the third embodiment, a measured distance (i.e., an interval of machining unevenness (stripe pattern) on the machined surface machined by the machining tool) between two points on the machined surface machined by the machine tool can be converted into a frequency. The obtained frequency is displayed by the display unit, while if physical data in a predetermined time section, such as a torque instruction to the motor that drives the drive shaft, a value of an active current that flows in the motor, and a value of a voltage applied to the motor, is subjected to a frequency analysis (for example, Fourier transformation), and thus obtained frequency spectrum is compared with the frequency displayed by the display unit, which will be useful for various analyses. For example, if the frequency spectrum with respect to the physical data obtained by the frequency analysis and the frequency into which the measured distance between the two points on the machined surface are compared with each other, specifying a vibration source that is a cause of machining unevenness (stripe pattern) can be easily performed.

What is claimed is:

1. A waveform display device, comprising:
a processor configured to execute a program to
    acquire position information of a drive shaft of a machine tool in a time series manner;
    acquiring acquire physical data that represents an operation status of the drive shaft in a time series manner;
    designate a time section that is a display target in a time series of the physical data or the position information;
    calculate an average tangent direction speed of a tool tip end point of the machine tool in the time section based on the position information and configuration information of the machine tool;
    perform a frequency analysis of the physical data or the position information in the time section to output a frequency spectrum; and
    convert a frequency of the frequency spectrum into a distance between two points on a machined surface of the machine tool that corresponds to the frequency using the average tangent direction speed; and
a display configured to display the distance between the two points.

* * * * *